US012779596B2

(12) United States Patent
Rojas et al.

(10) Patent No.: US 12,779,596 B2
(45) Date of Patent: Nov. 3, 2026

(54) LASER MACHINING AND RELATED CONTROL FOR ADDITIVE MANUFACTURING

(71) Applicant: Embry-Riddle Aeronautical University, Inc., Daytona Beach, FL (US)

(72) Inventors: Eduardo Antonio Rojas, Port Orange, FL (US); Susan Davis Allen, New Smyrna Beach, FL (US)

(73) Assignee: Embry-Riddle Aeronautical University, Inc., Daytona Beach, FL (US)

( * ) Notice: Subject to any disclaimer, the term of this patent is extended or adjusted under 35 U.S.C. 154(b) by 973 days.

(21) Appl. No.: 18/048,349

(22) Filed: Oct. 20, 2022

(65) Prior Publication Data

US 2023/0127791 A1 Apr. 27, 2023

Related U.S. Application Data

(60) Provisional application No. 63/270,903, filed on Oct. 22, 2021.

(51) Int. Cl.
*B23K 26/70* (2014.01)
*B23K 26/40* (2014.01)
(Continued)

(52) U.S. Cl.
CPC ............ *B23K 26/40* (2013.01); *B23K 26/705* (2015.10); *B23K 26/707* (2015.10); *B33Y 30/00* (2014.12); *B33Y 40/20* (2020.01); *B33Y 50/02* (2014.12)

(58) Field of Classification Search
CPC .... B23K 26/40; B23K 26/705; B23K 26/707; B23K 26/03; B23K 26/0624;
(Continued)

(56) References Cited

U.S. PATENT DOCUMENTS 4,894,115 A * 1/1990 Eichelberger ..... H01L 21/76804 134/1
5,410,179 A * 4/1995 Kornrumpf ........... H01F 41/045 257/730
(Continued)

FOREIGN PATENT DOCUMENTS

CN 113136011 A 7/2021
JP 2003243752 A * 8/2003
(Continued)

OTHER PUBLICATIONS

"Additively Manufactured 3D Reconfigurable Antennas", National Science Foundation Grant Abstract # 1944599, Awardee: Embry-Riddle Aeronautical University, Inc., (Start Date: Mar. 1, 2021), 3 pgs.

(Continued)

*Primary Examiner* — Tiffany T Tran
(74) *Attorney, Agent, or Firm* — Schwegman Lundberg & Woessner, P.A.

(57) ABSTRACT

Additive manufacturing can include use of a laser-machining technique. Laser machining can be used to form cavities, trenches, or other features in an additively-manufactured structure. Spectroscopy can be performed to monitor a laser machining operation. For example, a laser-enhanced additive manufacturing process flow can include depositing a conductive layer on a surface of a dielectric layer, and conductively isolating a first region from a second region of the conductive layer using ablative optical energy, including applying ablative optical energy to the conductive layer, monitoring a spectrum of an ablative plume generated by applying the ablative optical energy, and controlling the ablative optical energy in response to a characteristic of the spectrum of the ablative plume.

5 Claims, 9 Drawing Sheets

(51) Int. Cl.

*B33Y 30/00* (2015.01)
*B33Y 40/20* (2020.01)
*B33Y 50/02* (2015.01)

(58) Field of Classification Search

CPC .... B23K 26/364; B23K 26/402; B33Y 30/00; B33Y 40/20; B33Y 50/02; B33Y 10/00; B33Y 70/00; B29C 64/106; B29C 64/393; B29C 64/188

See application file for complete search history.

(56) References Cited

U.S. PATENT DOCUMENTS

| | | | | |
|---|---|---|---|---|
| 5,518,956 | A * | 5/1996 | Liu | H05K 3/225 438/73 |
| 8,383,985 | B2 | 2/2013 | Twelves, Jr. et al. | |
| 10,639,721 | B2 | 5/2020 | Das et al. | |
| 10,906,290 | B2 | 2/2021 | Yerazunis et al. | |
| 2007/0138154 | A1 * | 6/2007 | Seong | B23K 26/40 219/121.73 |
| 2014/0336680 | A1 | 11/2014 | Medina et al. | |
| 2016/0252398 | A1 * | 9/2016 | Day | G01N 21/718 356/318 |
| 2018/0079132 | A1 * | 3/2018 | Giesbers | B29C 64/106 |
| 2018/0257680 | A1 * | 9/2018 | Nishimura | B23K 26/082 |
| 2019/0232552 | A1 * | 8/2019 | De Samber | H05K 1/029 |
| 2020/0180080 | A1 | 6/2020 | Zediker | |
| 2022/0266379 | A1 * | 8/2022 | Yoshida | G01N 21/31 |
| 2022/0289615 | A1 * | 9/2022 | Wynne | C03B 23/203 |

FOREIGN PATENT DOCUMENTS

| | | | |
|---|---|---|---|
| JP | 2018-138699 | A | 9/2018 |
| KR | 101715344 | B1 | 3/2017 |
| WO | WO-2021/044258 | A1 | 3/2021 |

OTHER PUBLICATIONS

Kramida, A., et al., "NIST LIBS Database, NIST, National Institute of Standards and Technology", [online]. Retrieved from the Internet: < URL: https://physics.nist.gov/PhysRefData/ASD/LIBS/libs-form.html>, (2013), 2 pgs.

Larimore, Z., et al., "Additive Manufacturing of Luneburg Lens Antennas Using Space-Filling Curves and Fused Filament Fabrication", IEEE Transactions on Antennas and Propagation, 66(6), (2018), 2818-2827.

Piekarz, I., et al., "Application of Aerosol Jet 3-D Printing With Conductive and Nonconductive Inks for Manufacturing", IEEE Transactions on Components, Packaging and Manufacturing Technology, I. 9(3), (2019), 586-595.

Rojas-Nastrucci, E. A., et al., "Characterization and Modeling of K-Band Coplanar Waveguides Digitally Manufactured Using Pulsed Picosecond Laser Machining of Thick-Film Conductive Paste", IEEE Transactions on Microwave Theory and Techniques, 65(9), (Sep. 2017), 3180-3187.

Rojas-Nastrucci, E. A., et al., "Direct Digital Manufacturing of mm-Wave Vertical Interconnects", 2018 IEEE 19th Wireless and Microwave Technology Conference (WAMICON), Apr. 9-10, 2018, (2018), 1-3.

Rojas-Nastrucci, E. A., et al., "Ka-Band Characterization of Binder Jetting for 3-D Printing of Metallic Rectangular Waveguide Circuits and Antennas", IEEE Transactions on Microwave Theory and Techniques, 65(9), (2017), 3099-3108.

Rojas-Nastrucci, E. A., et al., "Laser Enhanced Direct Print Additive Manufacturing for Mm-Wave Components and Packaging", 2017 International Conference on Electromagnetics in Advanced Applications (ICEAA), Sep. 11-15, 2017, (2017), 1531-1534.

Tehrani, B. K., et al., "Inkjet Printing of Multilayer Millimeter-Wave Yagi-Uda Antennas on Flexible Substrates", IEEE Antennas and Wireless Propagation Letters, vol. 15, (2016), 143-146.

Tehrani, B. K., et al., "Inkjet-printed 3D interconnects for millimeter-wave system-on-package solutions", 2016 IEEE MTT-S International Microwave Symposium (IMS), May 22-27, 2016 2016, (2016), 1-4.

Xin, H., et al., "3-D-Printed Microwave and THz Devices Using Polymer Jetting Techniques", Proceedings of the IEEE, 105(4), (2017), 737-755.

* cited by examiner

LASER MACHINING AND RELATED CONTROL FOR ADDITIVE MANUFACTURING

CLAIM OF PRIORITY

This patent application claims the benefit of priority of Rojas et al., U.S. Provisional Patent Application Ser. No. 63/270,903, titled "LASER MACHINING AND RELATED CONTROL FOR ADDITIVE MANUFACTURING," filed on Oct. 22, 2021, which is hereby incorporated by reference herein in its entirety.

STATEMENT REGARDING FEDERALLY SPONSORED RESEARCH OR DEVELOPMENT

This invention was made with government support under award number 1944599 awarded by the National Science Foundation. The government has certain rights in the invention.

FIELD OF THE DISCLOSURE

This document pertains generally, but not by way of limitation, to additive manufacturing of electrical structures, and more particularly to techniques for performing and monitoring laser machining of portions of structures including additively-manufactured elements.

BACKGROUND

Additive manufacturing generally refers to techniques involving deposition of material, such as via spraying, dispensing, or extrusion, for example, to form mechanical or electrical structures in an additive manner. Examples of generally-available additive manufacturing approaches include polymer jetting (e.g., involving depositing a polymer material which is then cured), fused deposition molding, or dispensing of paste materials such as comprising a paste composition having a conductive species. Additive manufacturing facilitates fabrication of structures such as extending along or protruding from non-planar surfaces, such as conforming to curved or irregular surfaces. Additive manufacturing also permits flexibility in manufactured structures, such as permitting variation, iteration, or fabrication of entirely different structural configurations with minimal re-tooling.

SUMMARY OF THE DISCLOSURE

Additive manufacturing (AM) techniques such as aerosol jet printing (AJP), laser-enhanced direct print (LE-DPAM), and inkjet printing can be used at least in part for fabrication of flexible, high-performance, electronics and structures, e.g., RF circuits, antennas, sensors, or metamaterials, such as structures having tailored mechanical, electrical, or optical properties. As an illustrative example, using RF circuits and antennas as a case study, additively manufactured (AM) antennas can be made by fused deposition modeling (FDM) or polymer jetting to achieve complex geometries. However, generally available techniques such as FDM to perform such fabrication may be restricted to either flat (e.g., planar structures) or reproduction of simple structures such as horn antennas, waveguides, or reflectors. By contrast, the apparatus and techniques described herein (e.g., laser-enhanced techniques with monitoring, such as laser-enhanced direct-print techniques) allow fabrication of structures conforming to curved or irregular surfaces. For example, the techniques described herein facilitate fabrication of antenna structures suitable for aviation or aerospace environments, such as conforming to curved (e.g., compound curved) surfaces, or possessing shapes or material configurations to provide desired antenna performance characteristics that would otherwise be difficult or impossible to achieve with a flat structure, for example.

As mentioned above, laser machining can be used in combination with additive manufacturing, such as to remove material from a deposited layer. The present inventors have recognized, among other things, that laser machining can present various challenges. One such challenge is a lack of feedback for closed-loop control of the laser machining process, such as to enhance one or more of consistency, efficiency, or reliability of material processing. In particular, generally-available approaches to laser-trimming of AM structures are performed without closed-loop monitoring of structures being ablated. Such open-loop approaches can fail to account for variations in material properties or material geometry (e.g., dimensional or shape variation).

To help remedy such challenges, the present inventors have developed, among other things, techniques for monitoring of laser ablation using an observed spectrum of a laser plasma during processing. Laser induced breakdown spectroscopy (LIBS) is a technique that can be used for trace analysis of items such as steel and other alloy composition, analysis of artworks, and tracing of archeological materials, among other applications. The present inventors have recognized that LIBS can be used to provide monitoring of laser machining in an additive manufacturing context. Such monitoring can be used for control of a laser machining operation, or even to gather data concerning the fabrication of AM structures (e.g., to observe structural characteristics indicative of a quality or process variation in the AM fabrication flow).

In an example, a technique such as an automated or semi-automated method can include depositing a conductive layer on a surface of a dielectric layer, and conductively isolating a first region from a second region of the conductive layer using ablative optical energy. Conductively isolating the regions can be performed by applying ablative optical energy to the conductive layer, monitoring a spectrum of an ablative plume generated by applying the ablative optical energy, and controlling the ablative optical energy in response to a characteristic of the spectrum of the ablative plume. In another example, a technique such as an automated or semi-automated method can include depositing a first conductive layer, depositing a dielectric layer on a surface of the first conductive layer, forming apertures or holes in the dielectric layer using ablative optical energy, depositing a second conductive layer on a surface of the dielectric layer opposite the first conductive layer, the depositing the second conductive layer including filling at least some of the apertures or holes in the dielectric layer with conductive material, and conductively isolating a first region from a second region of the second conductive layer using ablative optical energy. The conductively isolating the first region from the second region can include applying ablative optical energy to the second conductive layer, monitoring a spectrum of an ablative plume generated by applying the ablative optical energy, and controlling the ablative optical energy in response to a characteristic of the spectrum of the ablative plume.

In an example, one or more methods or techniques shown and described herein can performed at least in part using a system, comprising a dispenser configured to deposit a conductive material to form a conductive layer on a surface of a dielectric layer, a source of ablative optical energy to direct the ablative optical energy to a specified region of the conductive layer, a spectrometer optically coupled with the specified region of the conductive layer to monitor a spectrum of an ablative plume generated in response to application of the ablative optical energy from the source, and a controller coupled to the source of ablative optical energy and the spectrometer, the controller configured to monitor a characteristic of the ablative plume and, in response, control the source of ablative optical energy.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The apparatus and techniques described herein are applicable to a broad range of additive manufacturing approaches where laser machining is used. For example, Laser Enhanced DPAM (LE-DPAM) is a process that can achieve higher resolution than other additive manufacturing approaches. LE-DPAM generally includes use of thick-film deposition (e.g., microdispensing) such as to provide, as an illustrative example, 100 micrometer (μm)-thick layers. LE-DPAM can use ablative pulsed laser machining to achieve feature sizes of 10 μm by, using the laser, removing previously deposited material. Generally, LE-DPAM also enables manufacturing of high-frequency vertical interconnects (e.g., via structures). Laser processing need not be restricted to removal of material to entirely isolate different regions of a DPAM-fabricated structure. For example, picosecond laser processing of conductive ink solidifies conductive flakes (e.g., silver flakes) in slot structures. As an illustrative example, such processing can increase an effective RF conductivity of coplanar waveguides (CPW) by a factor of 100× from 0.3 MS/m to 30 MS/m up to 40 GHz.

Figure 1A:
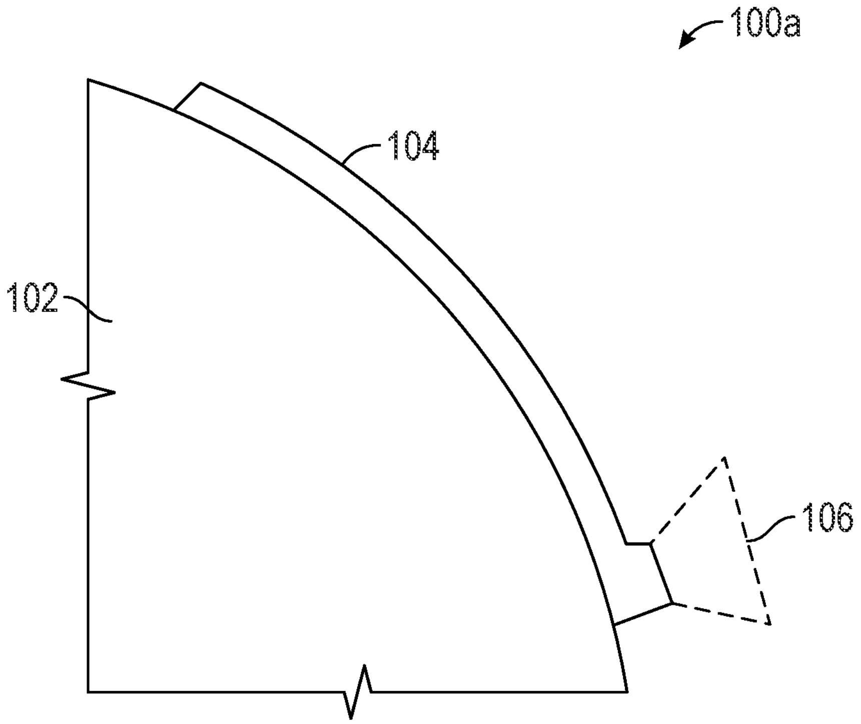
FIG. 1A and FIG. 1B illustrate respective operations that can be included in a laser-enhanced additive manufacturing process.
Figure 1B:
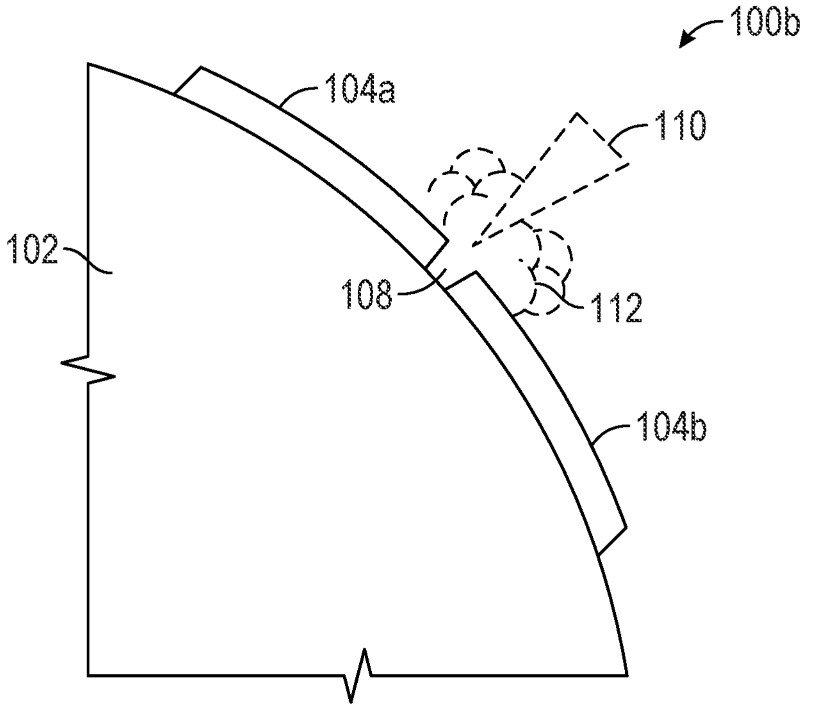

FIG. 1A and FIG. 1B illustrate respective operations that can be included in a laser-enhanced additive manufacturing process. A substrate 102, such as a dielectric material can be provided. The substrate can include a structure such as a skin, window, radome, or other portion of a vehicle, as an illustrative example. A conductive layer 104 can be deposited on a surface of the substrate 102, such as using a dispenser 106, or other similar approach (e.g., extrusion, ink-jet printing). The material forming the conductive layer 104 can include a conductive ink (e.g., a paste or liquid including a conductive medium). The conductive layer 104 can be dried or cured to form a portion of an electrical structure 100*a*. In FIG. 1B, optical energy can be applied to the conductive layer, such as an output 110 from a laser. As the conductive layer is ablated, a plume 112 may be generated. The spectrum of emission generated by the plume 112 may be indicative of constituents of material in the region 108 being ablated by the output 110 of the laser. Monitoring of the plume 112 can be used to control application of ablative optical energy, such as to terminate or otherwise tailor application of such energy when constituents of the substrate 102 are detected in the plume 112, or when constituents of the substrate 102 are detected in the plume 112 in a quantity exceeding a specified abundance. In an example, a parameter associated with application of ablative optical energy can be adjusted in response to monitoring of the plume 112. Application of the ablative optical energy output 110 from the laser can conductively isolate regions of the conductive layer into a first region 104*a* and a second region 104*b*, forming a portion of an electrical structure 100*b*, as an illustrative example. As shown below, laser-enhanced DPAM can be used for fabrication of multi-layer structures, such as to provide a conformal stack of dielectric and conductive layers.

FIG. 2A, FIG. 2B, FIG. 2C, FIG. 2E, and FIG. 2F illustrate respective operations that can be included in a laser-enhanced additive manufacturing process, such as can include depositing two conductive layers and, optionally, forming conductive structures (e.g., via structures) to provide an electrical interconnection between conductive layers. The process shown in FIG. 2A through FIG. 2F can include use of 5-axis printing such as including microdispensing, and femtosecond pulsed laser machining. As an illustration, the process flow can include scanning a 3D object 202 (e.g., substrate) to extract a profile. The 3D object 202 may be planar such as having a generally flat contour, non-planar such as having a generally curved contour, or have some other 3D shape or configuration. As an illustrative example, a micro-epsilon IDL1750 scanner (MICRO-EPSILON MESSTECHNIK GmbH & Co. KG, Ortenburg, Germany) can be used along with an nScrypt-configured tabletop printer (Nscrypt, Orlando, FL, U.S.A.). The 3D object 202 can be heated using a heating bed, which is set to 80° C. Then, a micro-dispensing pump 206 can be loaded with a conductive ink such as DuPont CB028 (DuPont, Wilmington, DE, U.S.A), to dispense a first conductive ink layer 204 on the 3D object 202, with a thickness after curing of ~50 μm, as shown illustratively in FIG. 2A The first conductive ink layer 204 may be conformal to the 3D object 202. Note that the 3D object 202 is shown as fixed for illustration but scanning for dispensing or other operations can be accomplished by rotation, translation, or elevation of the substrate while the dispenser or laser output remains stationary, or vice versa (or each could be actuated in specified degrees of freedom to provide relative motion between the dispenser or laser, and the substrate). In this illustrative example, the ink dries for 20 minutes while the part 200*a* is kept in the system.

Figure 2A:
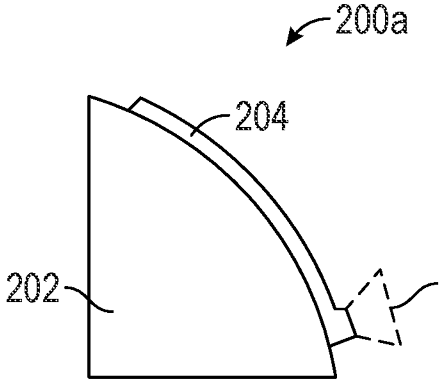
FIG. 2A, FIG. 2B, FIG. 2C, FIG. 2D, FIG. 2E, and FIG. 2F illustrate respective operations that can be included in a laser-enhanced additive manufacturing process, such as can include depositing two conductive layers and, optionally, forming conductive structures (e.g., via structures) to provide an electrical interconnection between conductive layers.
Figure 2B:
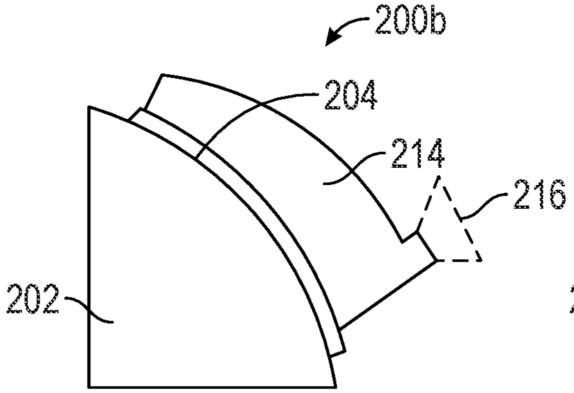

In the example of FIG. 2B showing part 200*b*, a micro-dispensing pump 216 (either the same micro-dispensing pump 206 shown in FIG. 2A or a different pump) can be loaded with a dielectric material (e.g., DuPont 8153), and dispensed over the dried first conductive ink layer 204 with a thickness of about 100 μm. In this illustrative example, the dielectric ink layer 214 is dried for 20 minutes, and more layers can be deposited to achieve a target total thickness. The thickness uniformity of the dielectric layer 214 can be controlled by a flow of the ink through the pump tip, which can be controlled by a valve opening and a printing height. Ink height variations can be around 10 μm/layer while using the apparatus mentioned here (e.g., nScrypt system and the DuPont 8153 ink on a layer that is 100 μm thick).

Figure 2C:
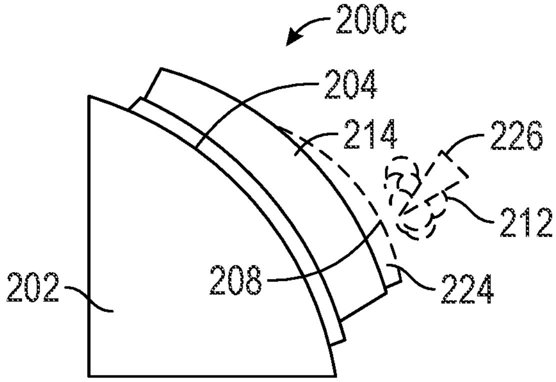

Pulsed laser machining can be used (as shown at FIG. 2C) to attempt to reduce layer thickness variation for prints that may require tight thickness tolerances. In the example of FIG. 2C showing part 200*c*, an optical energy source 226 (e.g., a laser) can be used to ablate or remove a portion 224 of the dielectric ink layer 214. The ablation process may produce an ablative plume 212 near the point of operation 208.

Figure 2D:
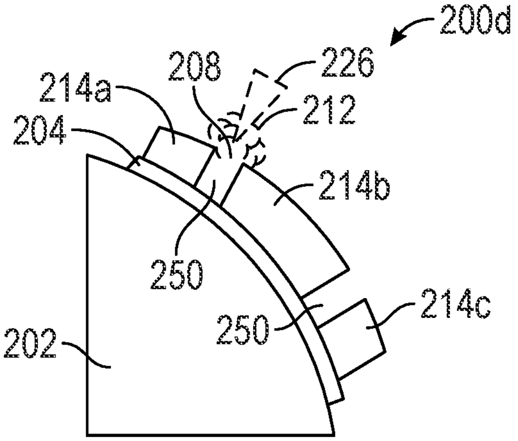

Pulsed laser machining can also be used to create cavities, apertures, or holes for inter-layer interconnects (e.g., via structures), as shown illustratively in FIG. 2D showing part 200*d*. In the example of FIG. 2D, an optical energy source 226 (e.g., a laser) can be used to ablate or remove a portion of the dielectric ink layer 214 to create machined cavities 250. The optical energy source 226 may be the same as the optical energy source 226 shown in FIG. 2C, or it may differ in one or more ways. The optical energy source 226 may produce an ablative plume 212 near the point of operation 208. The machined cavities 250 may separate the dielectric ink layer 214 into a first region 214*a*, a second region 214*b*, and a third region 214*c*.

Figure 2E:
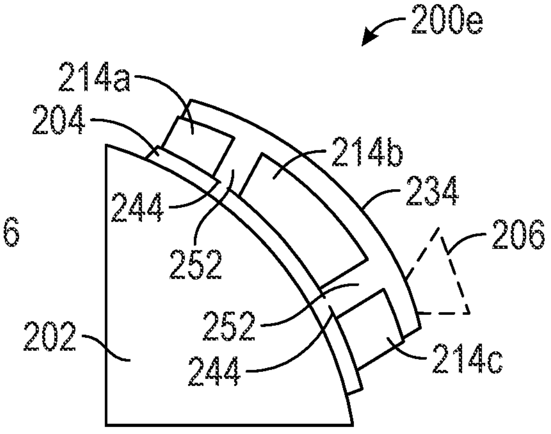

These machined cavities 250 can be filled with conductive ink as shown in FIG. 2E showing part 200*e*, and second conductive layer 234 can be deposited. The second conductive layer 234 may fill the machined cavities 250 creating a via structure 252 as a result of a continuous printing pattern, or the micro-dispensing pump 206 may adjust its printing pattern or properties to fill the machined cavities 250. For example, filling of cavities and deposition of another conductive layer can be performed with the same micro-dispensing pump 206 shown in FIG. 2A. The adjoining portion or portions 244 of the first conductive ink layer 204 and the second conductive ink layer 234 may be conductive to electricity. In an example, the first conductive ink layer 204 may be cleaned or otherwise prepared before the second conductive layer 234 is applied in an attempt to improve electrical conduction between layers.

Figure 2F:
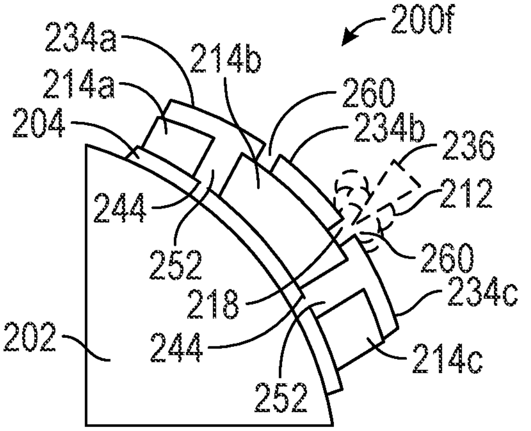

Features in the outward-facing conductive layer can also be established by laser machining, such as shown at FIG. 2F showing part 200*f*. For example, traces, lands, patches, or other features can be defined by laser machining of the second conductive layer 234 as shown in FIG. 2F. In the example of FIG. 2F, an optical energy source 236 can be used to ablate or remove a portion of the second conductive layer 234 to create machined cavities 260. The machined cavities 260 may separate the second conductive layer 234 into a first region 234*a*, a second region 234*b*, and a third region 234*c*. The first region 234*a*, second region 234*b*, and third region 234*c* may be electrically isolated from each other due to the machine cavities 260. In an example, the first region 234*a* and the third region 234*c* may be electrically coupled by the first conductive ink layer 204. The optical energy source 236 may be the same as the optical energy source 226 shown in FIG. 2C or it may differ in one or more ways from the optical energy source 226.

The optical energy source 236 may produce an ablative plume 212 near the point of operation 218. The constituents and properties of the ablative plume 212 in FIG. 2F may differ from the constituents and properties of the ablative plume 212 in FIG. 2C. The conductive ink used in the second conductive layer 234 may contain a metallic element, a metallic compound, or a substance with metallic properties such that the ablative plume 212 produced by ablating the second conductive layer 234 may have a unique and identifiable laser-induced breakdown spectroscopy (LIBS) spectrum. The dielectric ink layer 214 may not contain metallic elements, compounds, or substances with metallic properties, or may contain small or trace amounts of metallic elements, compounds, or substances with metallic properties, such that the ablative plume 212 produced by the dielectric ink layer 214 may be distinct and discernable from the ablative plume 212 produced by the second conductive layer 234. In an example, one or more constituents or components of the dielectric ink layer 214 or the second conductive layer 234 may be selected such that the LIBS spectra of the layers are different.

In one or more of the examples above, such as at FIG. 2C, FIG. 2D, or FIG. 2F, monitoring of a plume of ablated material can be performed such as for use in controlling laser machining. Such monitoring can include use of laser-induced breakdown spectroscopy (LIBS), as discussed elsewhere herein.

Figure 3:
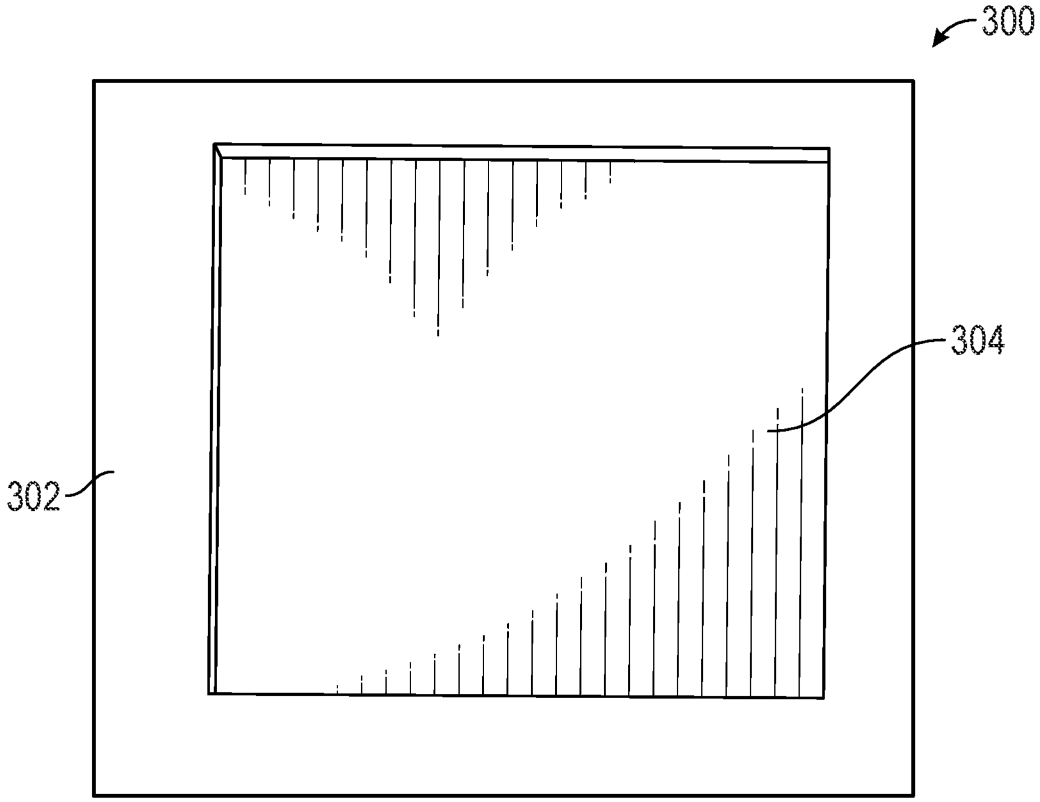
FIG. 3 shows an illustrative example comprising a dielectric layer formed from a dielectric ink, and a laser-machined cavity.

FIG. 3 shows an illustrative example 300 comprising a dielectric layer 302 formed from a dielectric ink, and a laser-machined cavity 304. Such a cavity 304 can be a feature as mentioned above in relation to laser machining of deposited layers, and such machining need not be restricted to removal of material from a conductive layer. In the illustrative example of FIG. 3, a 1 mm×1 mm cavity 304 in a dielectric layer 302 comprising cured DuPont 8153 ink was formed using laser ablation having a 360 femtosecond (fs) pulse width, 2 W average power, 100 kilohertz (kHz) repetition rate, and a scan rate of 20 millimeters per second.

Figure 4:
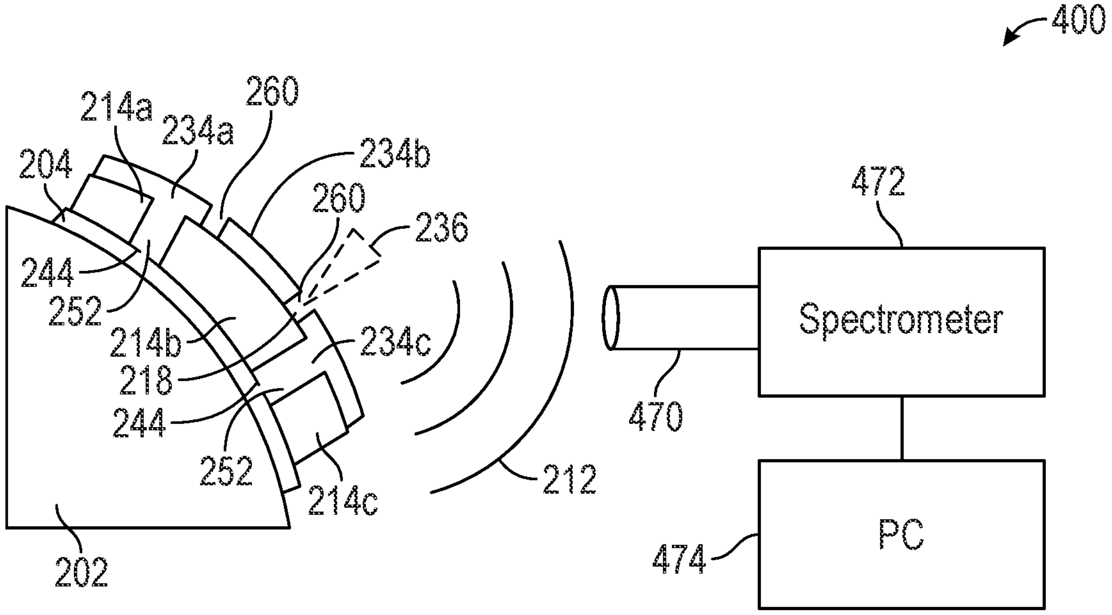
FIG. 4 shows an illustrative example comprising a system that can be used to implement a laser-enhanced additive manufacturing process.

FIG. 4 shows an illustrative example comprising a system 400 that can be used to implement a laser-enhanced additive manufacturing process. Generally, pulsed laser machining (PLM) is a highly energetic process that generates atoms and ionic species, or small molecular species and ionic species, in an ablative plume. Constituents in the plume generally produce a distinctive emission spectrum. The experimental results described below were obtained using a system as shown illustratively in FIG. 4. The system can include an optical energy source 236, such as a laser, with an output to direct ablative optical energy to a target, such as a conductive or dielectric layer that has been previously deposited. An ablative plume 212 (e.g., plasma emissions) from application of the ablative optical energy can be observed using an optical structure such as an optical fiber 470, coupled to a spectrometer 472 or other optical detector. Emission lines or other features of an emission spectrum can be determined, and a controller such as a personal computer 474 or embedded system can be used to control the optical energy source 236 (e.g., laser) or other parameters related to application of ablative optical energy (such as scan path, scan configuration, beam power, pulse width, pulse repetition rate, overall duration of application of optical energy, termination of application of optical energy, or the like).

Figure 5:
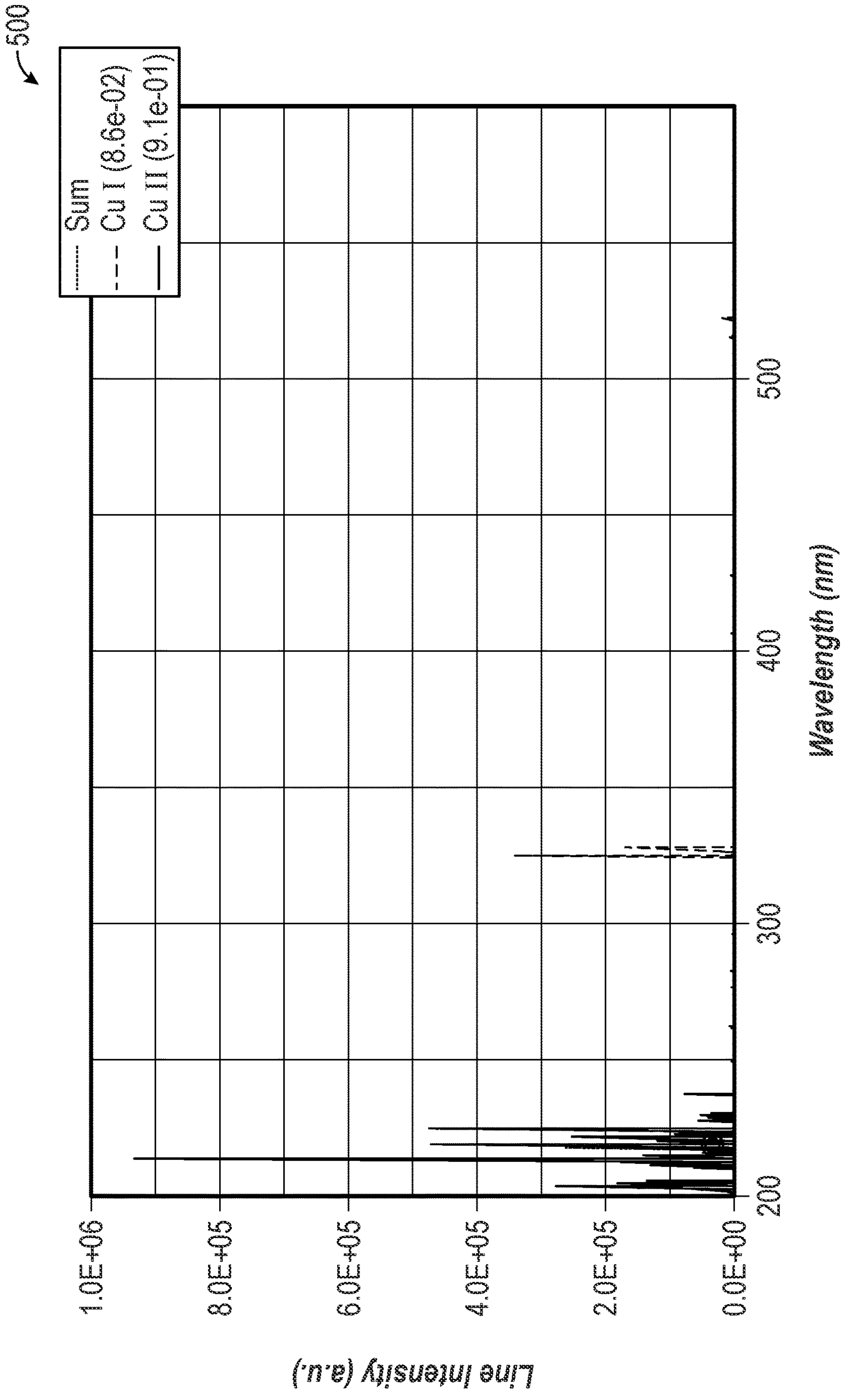
FIG. 5 shows an illustrative example comprising laser-induced breakdown spectroscopy (LIBS) spectra for respective copper species.

FIG. 5 shows an illustrative example comprising laser-induced breakdown spectroscopy (LIBS) spectra 500 for respective copper species published by the National institute of Standards and Technology (NIST). In the illustrative example of FIG. 5, there are three distinct spectral emission peak clusters, two in the ultraviolet range (around 200 nm and 300 nm) and one in the visible (e.g., a green Cu emission around 500 nm). In some laser machining contexts encountered by the inventors, the 500 nm peaks were of roughly the same magnitude as the 200 and 300 nm peaks.

An illustrative example given below is for removal of a copper (Cu) conductive layer from a dielectric substrate (alumina—$Al_2O_3$). This approach can be used, for example, to provide electrical isolation (open circuit) of regions of a conductive layer on each side, laterally, of a PLM trench. Because ablated material tends to fall back into the PLM-fabricated trench, challenges can exist to determine when electrical isolation has been achieved. In one approach, over-machining of the trench into the dielectric base is used. But such an approach can unnecessarily erode or ablate the dielectric underlayer. The present inventors have developed techniques, among other things, to ablate only the Cu conductive layer, leaving the dielectric substrate substantially undamaged. For example, by monitoring LIBS emission during PLM, completion of ablation of the Cu overlayer can be detected.

For the experimental data obtained herein, different counts of PLM scans were conducted and the maximum emission intensity for the 200, 300, and 500 nm LIBS peaks were plotted as a function of the count of scans. Accordingly, a closed-loop approach could be implemented where a magnitude of specified emission peaks (or a presence or absence of such peaks) could be used to control application of ablative optical energy in a contemporaneous manner (e.g., in real-time or near-real-time in the machining operation). The experimental data shown herein were obtained using a StellarNet fiber-optic coupler (StellarNet Inc., Tampa, FL, U.S.A.) and spectrometer with spectra collected as a function of time from the PLM samples using video capture in Canvas Studio (Infrastructure, Salt Lake City, UT, U.S.A.).

Figure 6A:
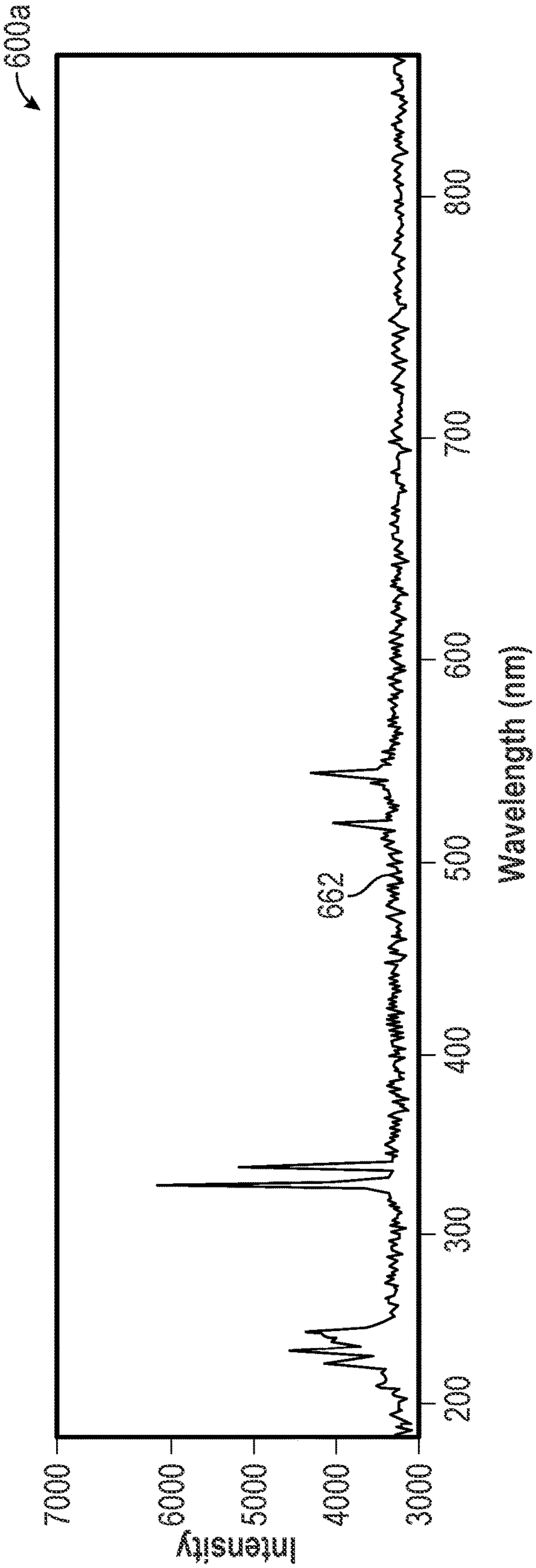
FIG. 6A and FIG. 6B show an illustrative example comprising laser-induced breakdown spectroscopy (LIBS) spectra for silver and copper
Figure 6B:
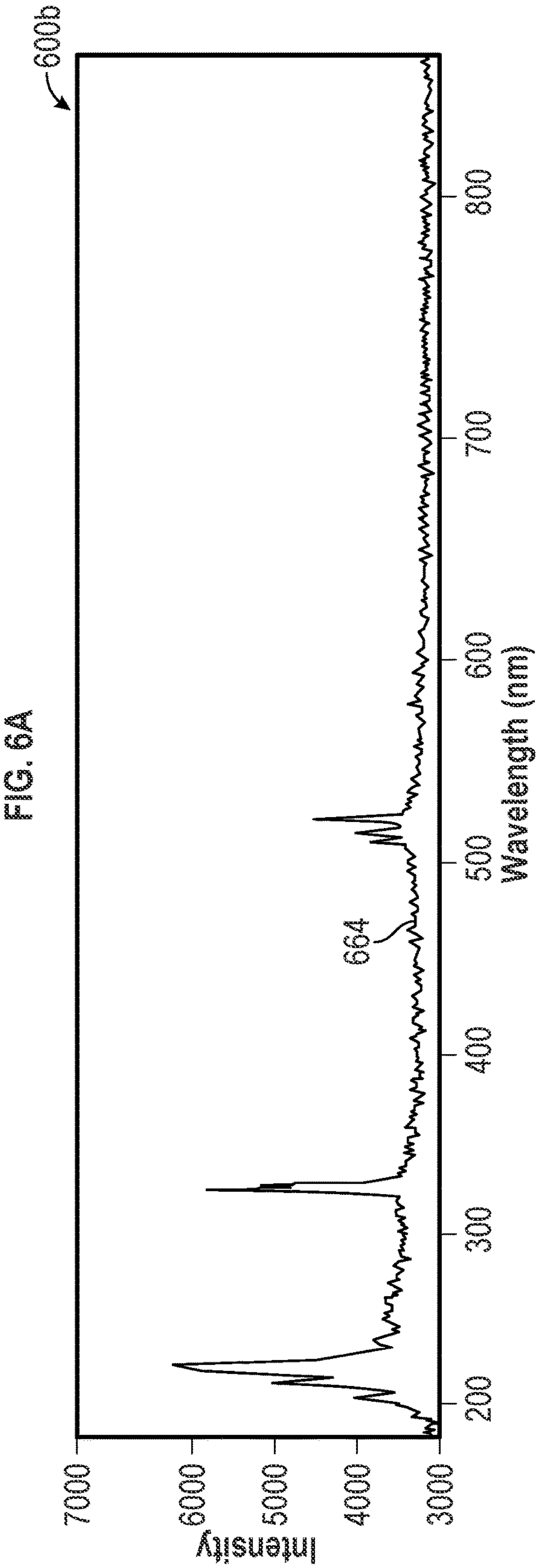

While the examples herein are predominantly related to LIBS spectroscopy of copper-layer ablation, the techniques are believed applicable to a variety of other materials where such materials exhibit distinct spectra. For example, FIG. 6A and FIG. 6B show an illustrative example comprising laser-induced breakdown spectroscopy (LIBS) spectra for silver 662 in graph 600*a* in FIG. 6A, and copper 664 in graph 600*b* in FIG. 6B. These graphs show that the two spectra can be distinct (and can be discernable from each other). Both spectra show emission peaks in the 200, 300, and 500 nm regions, and the two spectra can be distinguishable from each other. These spectra were recorded in a laboratory setting.

For the experimental results below, six circuit board samples were run with four cuts made on each board. Boards were cut with single 80% overlapping scans, two 80% overlapping scans, and three 80% overlapping scans, as shown illustratively in FIG. 7.

Figure 7:
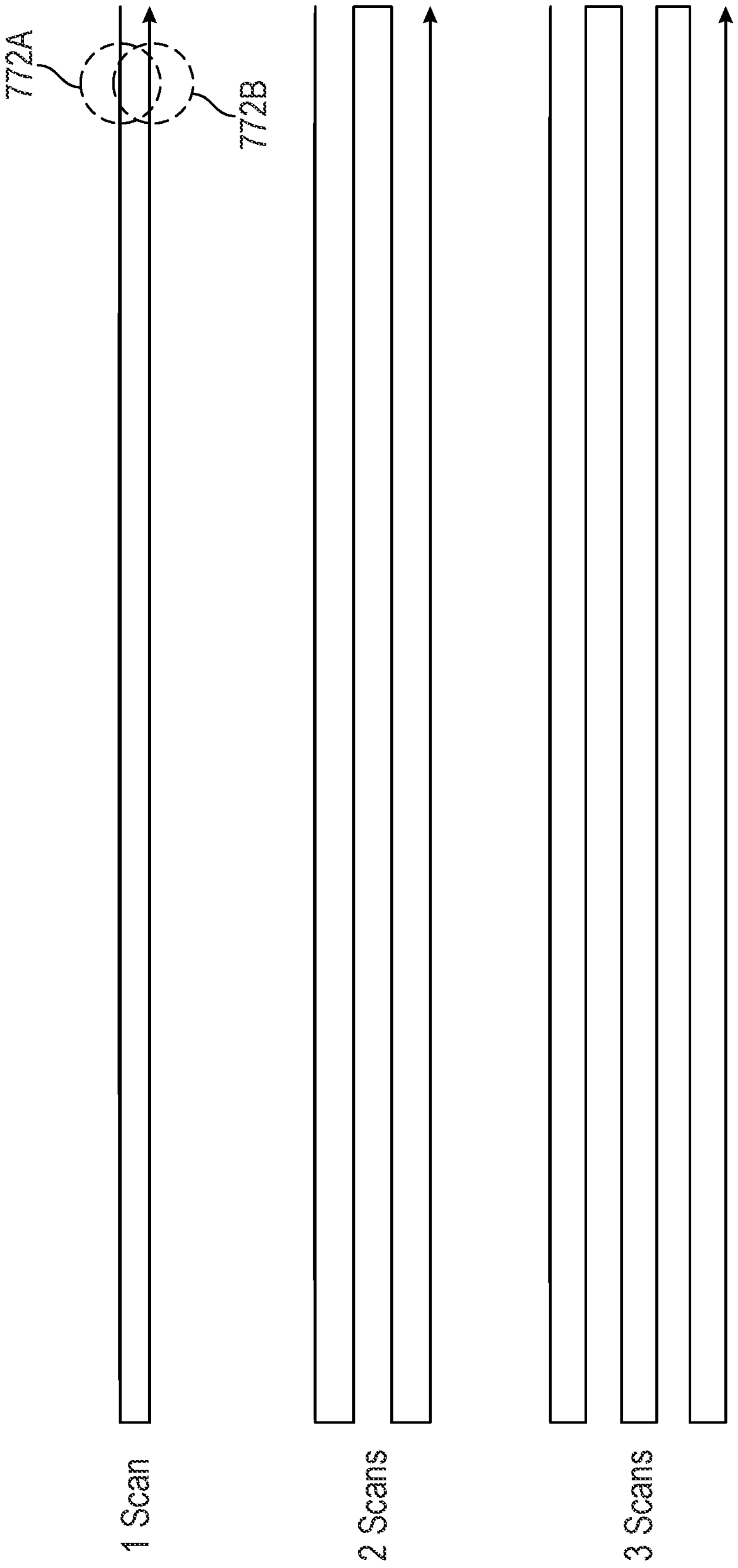
FIG. 7 shows illustrative examples of laser machining scan patterns for one round-trip scan (top), two round-trip scans (middle), and three round-trip scans (bottom).

FIG. 7 shows illustrative examples of laser machining scan patterns for one round-trip scan (top), two round-trip scans (middle), and three round-trip scans (bottom). Beam overlap refers to the beam footprint from one direction of the pass 772A overlapping with the beam footprint on the adjacent pass 772B. For example, if the beam width is approximately 0.1 mm, an 80% overlap pass would be conducted approximately 0.02 mm from the original pass which may result in an overlap of approximately 80%. In the example of Table 1, a pass is equivalent to one unidirectional movement of the laser. For example, a round-trip for the 2-scan pattern shown in FIG. 7 would require 4 passes, whereas a round-trip for the 3-scan pattern would require 6 passes.

TABLE 1

| Board 2 | 2 Scans | Scan Overlap | Electrical Conductivity Across PLM Cut |
|---|---|---|---|
| 2.1 CU 35 micrometer plate, 2 centimeter line, 100 mm/s 80% 50 KHz 10 ps 15 passes | | 80% | Open |
| 2.2 CU 35 micrometer plate, 2 centimeter line, 100 mm/s 80% 50 KHz 10 ps 15 passes | | 80% | Open |
| 2.3 CU 35 micrometer plate, 2 centimeter line, 100 mm/s 80% 50 KHz 10 ps 15 passes | | 80% | Open |
| 2.4 CU 35 micrometer plate, 2 centimeter line, 100 mm/s 80% 50 KHz 10 ps 15 passes | | 80% | Open |

| Board 5 | 2 Scans | Scan Overlap | Electrical Conductivity Across PLM Cut |
|---|---|---|---|
| 5.1 CU 35 micrometer plate, 2 centimeter line, 50 mm/s 80% 25 KHz 10 ps 15 passes | | 80% | Short |
| 5.2 CU 35 micrometer plate, 2 centimeter line, 50 mm/s 80% 25 KHz 10 ps 20 passes | | 80% | Open |
| 5.3 CU 35 micrometer plate, 2 centimeter line, 50 mm/s 80% 25 KHz 10 ps 25 passes | | 80% | Open |
| 5.4 CU 35 micrometer plate, 2 centimeter line, 50 mm/s 80% 25 KHz 10 ps 30 passes | | 80% | Open |

Figure 8A:
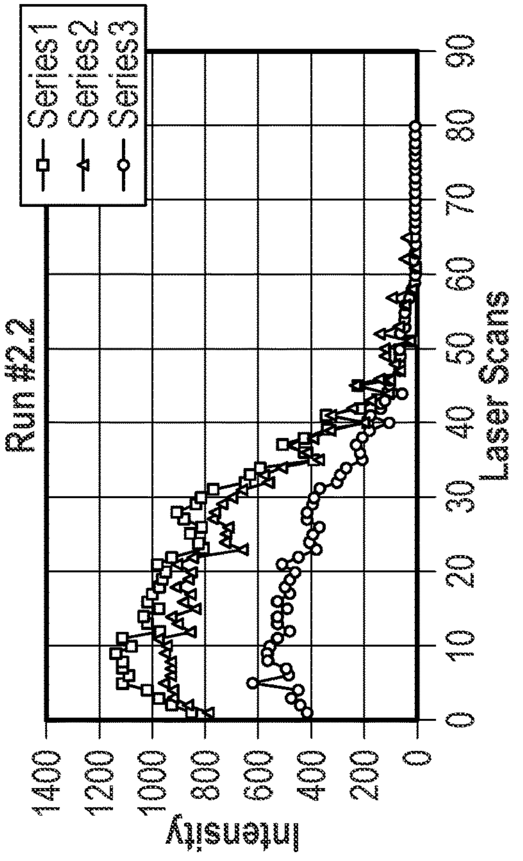
FIG. 8A, FIG. 8B, FIG. 8C, and FIG. 8D show illustrative examples comprising experimentally obtained data corresponding to three different regions of an emission spectrum (FIG. 8A and FIG. 8C), and corresponding cumulative laser-induced breakdown spectroscopy (LIBS) intensity (FIG. 8B and FIG. 8C), with all plots shown versus a count of laser scans.
Figure 8B:
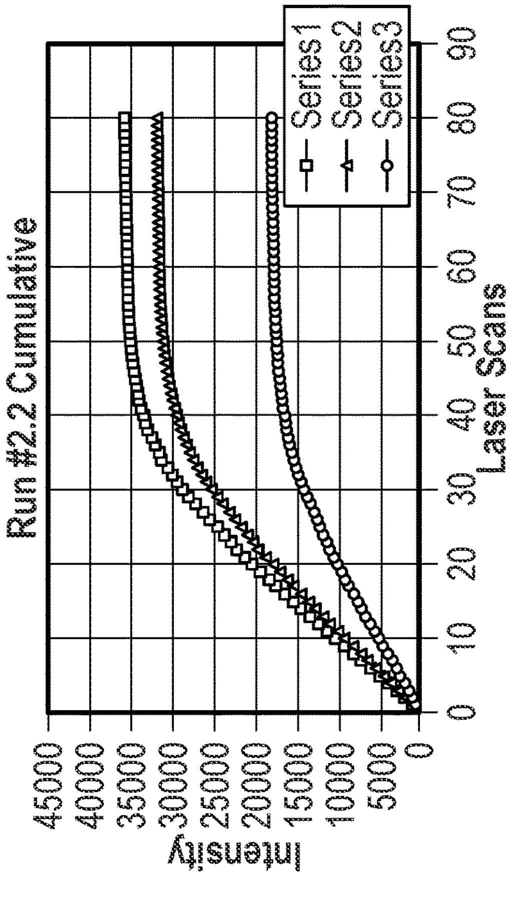
Figure 8C:
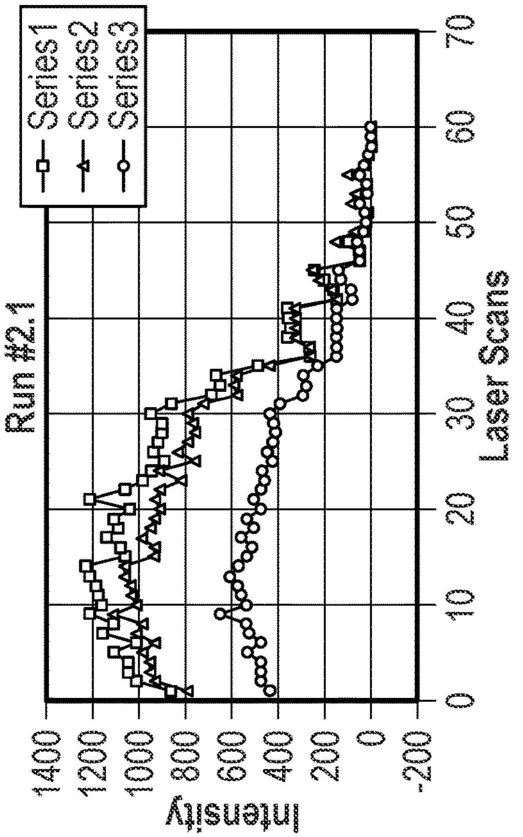
Figure 8D:
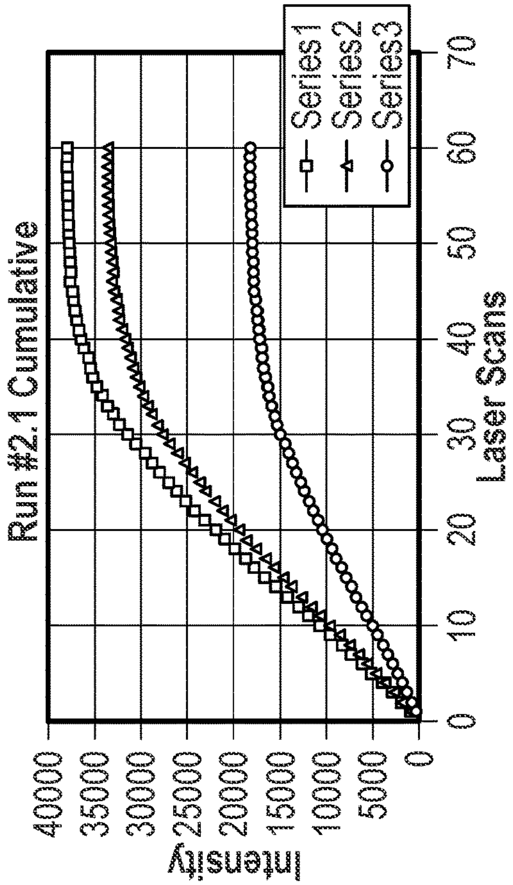

TABLE 1 shows a subset of the laboratory tests performed on the six circuit board samples, including the four cuts made with the 2-scan pattern on Board 2 and Board 5. The laser machining scan parameters are shown above in TABLE 1, and such parameters include the scan length, scan speed, power (80% of maximum), pulse repetition rate, pulse duration, and count of number of passes. FIG. 8A, FIG. 8B, FIG. 8C, and FIG. 8D show illustrative examples comprising experimentally obtained data corresponding to emission intensities in three different regions of an emission spectrum (FIG. 8A and FIG. 8C), and corresponding cumulative laser-induced breakdown spectroscopy (LIBS) intensity (FIG. 8B and FIG. 8D), with all plots shown versus a count of laser scans. Series1 shows peaks in the 200 nm region, Series2 shows peaks in the 300 nm region, and Series3 shows peaks in the 500 nm region with the vertical axis representing arbitrary units of intensity. FIG. 8B and FIG. 8D were obtained by cumulatively summing (e.g., discrete integration) the results of FIG. 8A and FIG. 8C respectively. FIG. 8A and FIG. 8B show data for Cut #2 in Board 2 and FIG. 8C and FIG. 8D. show data for Cut #1 in Board 2.

Figure 9A:
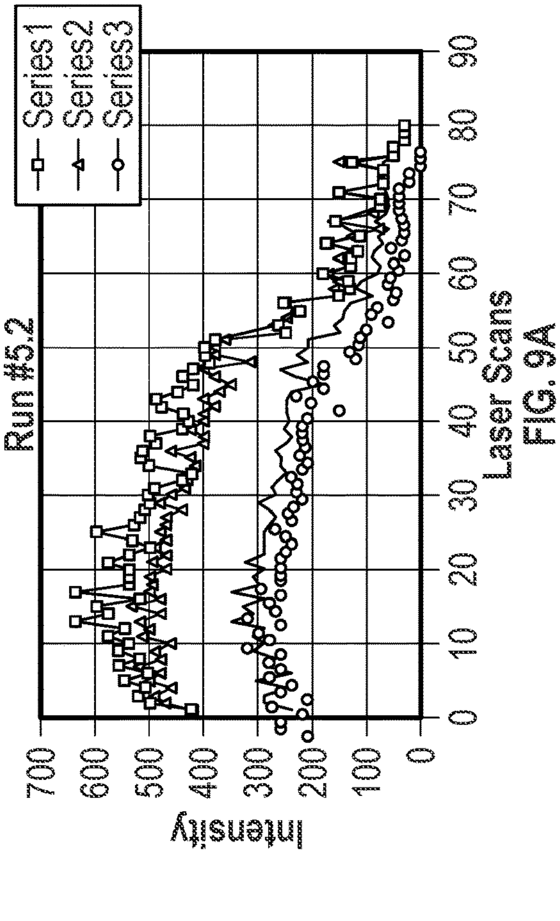
FIG. 9A, FIG. 9B, FIG. 9C, and FIG. 9D show illustrative examples comprising experimentally obtained data corresponding to three different regions of an emission spectrum (FIG. 9A and FIG. 9C), and corresponding cumulative laser-induced breakdown spectroscopy (LIBS) intensity (FIG. 9B and FIG. 9D), with all plots shown versus a count of laser scans.
Figure 9B:
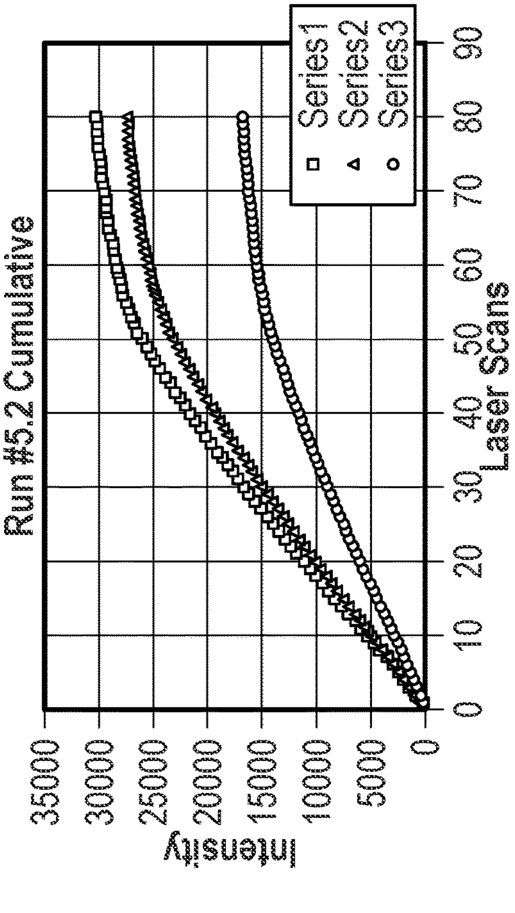
Figure 9C:
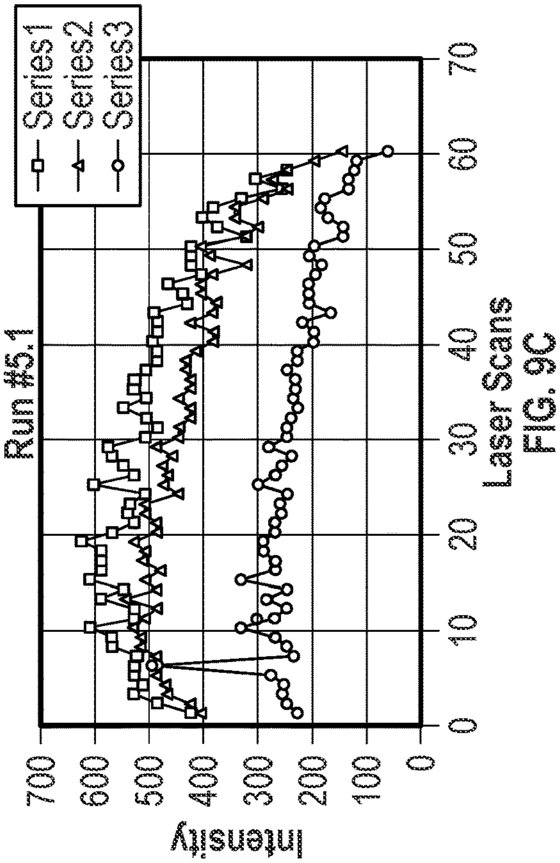
Figure 9D:
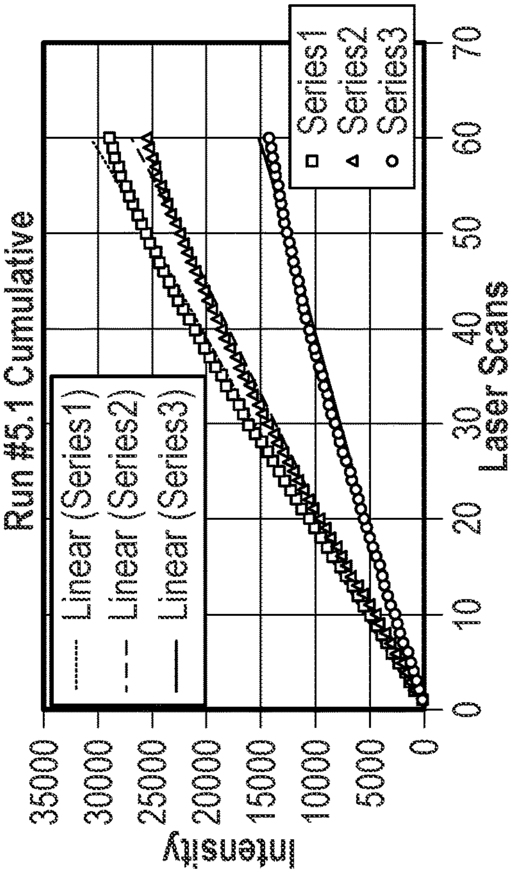

FIG. 9A, FIG. 9B, FIG. 9C, and FIG. 9D show illustrative examples comprising experimentally obtained data corresponding to emissions intensities in three different regions of an emission spectrum (FIG. 9A and FIG. 9C), and corresponding cumulative laser-induced breakdown spectroscopy (LIBS) intensity (FIG. 9B and FIG. 9D), with all plots shown versus a count of laser scans. Series1 shows peaks in the 200 nm region, Series2 shows peaks in the 300 nm region, and Series3 shows peaks in the 500 nm region with the vertical axis representing arbitrary units of intensity. FIG. 9B and FIG. 9D were obtained by cumulatively summing (e.g., discrete integration) the results of FIG. 9A and FIG. 9C respectively. FIG. 9A and FIG. 9B show data for Cut #2 in Board 5 and FIG. 9C and FIG. 9D. show data for Cut #1 in Board 5.

Generally, in the laboratory experiments, debris accumulation in the PLM trench is harder to remove with a single overlapping scan than for two or three scans overlapping by 80% such as following paths as shown illustratively in FIG. 7. For this reason, a series of two-three overlapping scans appeared more effective in establishing electrical isolation of the PLM machined pattern in a conductive layer. As noted in TABLE 1, all but one of the experimentally obtained data resulted in desired electrical isolation of the PLM machined pattern.

Referring to FIG. 8B, FIG. 8D, FIG. 9B, and FIG. 9D, simple accumulative intensities were determined as a function of scan count. Differential (first derivative) and second derivative plots were considered as a method of measuring for a desired endpoint (e.g., the complete removal of conductive material from the PLM trench and electrical isolation of an PLM-defined conductive pad). The cumulative plots show behavior that can be modeled piece-wise as two straight lines with different slopes. The initial slope is steeper than the second with a gradual transition from one to the other. It is believed, without being bound by theory, that the second straight line would be basically flat if the baseline of the measurements were zero. Again, without being bound by theory, a closed-loop monitoring scheme could include determining where the slope of the cumulative plot begins to flatten, as an illustrative example, and a machining operation could be deemed completed upon observation of such flattening, or other parameters could be varied to achieve such flattening. For example, in Scan 5.1, corresponding to the first row in TABLE 1 and FIG. 9D, a short remained across the PLM trench, and the flattening has not yet occurred or is less distinct in the corresponding cumulative plot shown in FIG. 9B, at the upper end of the scan count.

Figure 10:
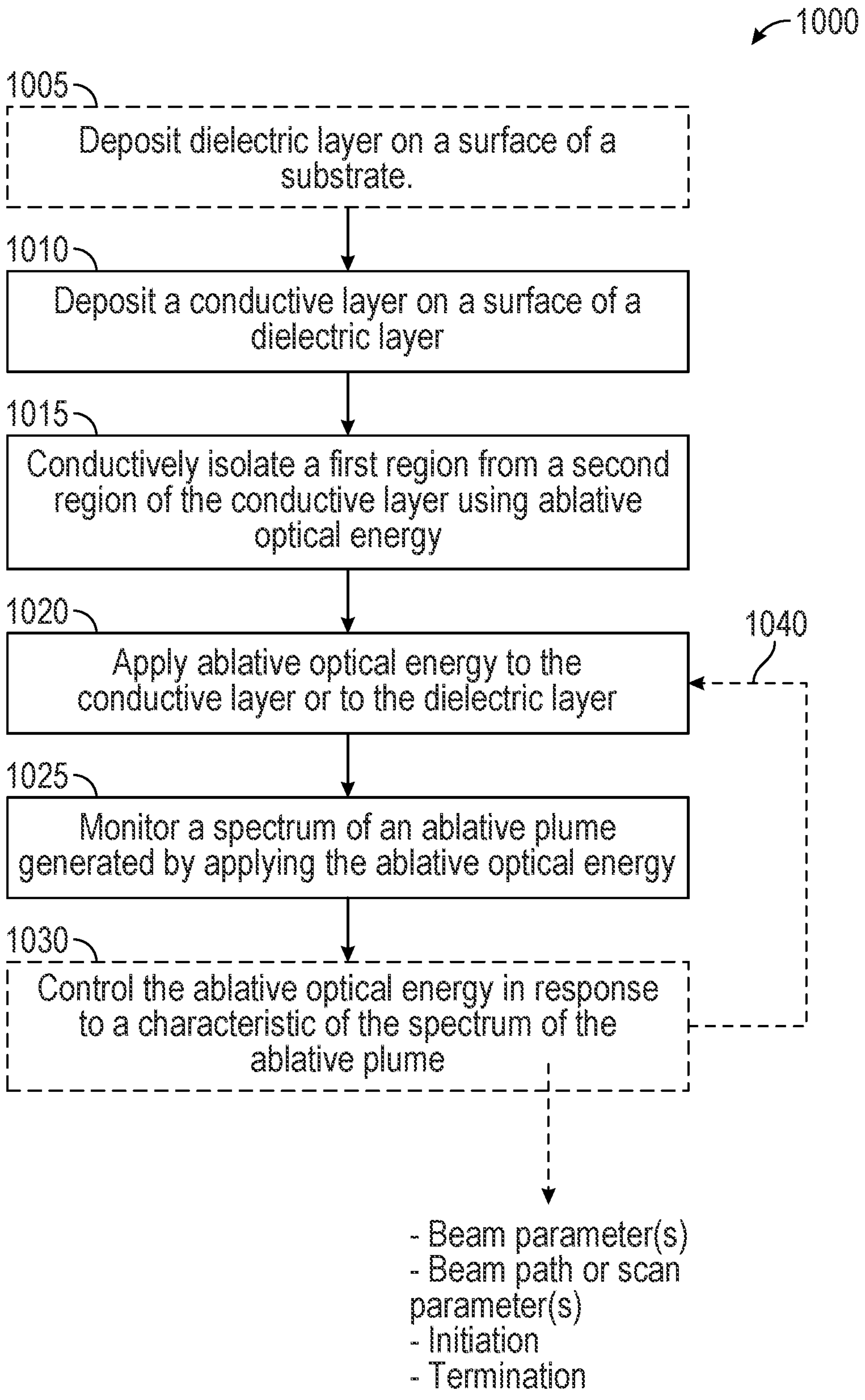
FIG. 10 illustrate generally a technique, such as a method, for performing laser-enhanced additive manufacturing.

FIG. 10 illustrates generally a technique 1000, such as a method, for performing laser-enhanced additive manufacturing. For example, at 1010, a conductive layer can be deposited on a surface of a dielectric layer. The dielectric layer can be a substrate, or another deposited layer. For example, at 1005, a dielectric layer can be deposited upon which the conductive layer is deposited at 1010. The dielectric layer can be formed by additive manufacturing or other techniques. At 1015, one or more features can be formed in the conductive layer using ablative optical energy. For example, a first region in the conductive layer deposited at 1010 can be isolated from a second conductive region of the conductive layer, such as using pulsed laser machining by applying ablative optical energy to the conductive layer at 1020 (or to another layer such as a dielectric layer for establishing cavities or other features, planarizing, or making a uniform thickness, for example) and monitoring a spectrum of an ablative plume generated by applying the ablative optical energy at 1025.

Optionally, the ablative optical energy can be controlled at 1030, such as in response to such monitoring, such as including adjusting one or more beam parameters (e.g., pulse width, repetition rate, power), or beam path (e.g., scan) parameters, such as beam overlap, count of scans, or scan rate. Such control can include one or more of continuing application of ablative optical energy in response to a characteristic of a detected spectrum remaining above or below a specified threshold or terminating application of ablative optical energy in response to a characteristic of a detected spectrum remaining above or below a specified threshold. As mentioned elsewhere herein, monitoring of the ablative plume can be performed in a closed-loop manner, such as providing feedback 1040 to continue application of ablative optical energy at 1020, such as using adjusted or modified parameters established at 1030.

Generally, the technique 1000 of FIG. 10 can be implemented using apparatus or techniques as shown and described elsewhere herein, such as including use of LIBS to monitor the spectrum of the ablative plume at 1025.

Each of the non-limiting aspects above can stand on its own or can be combined in various permutations or combinations with one or more of the other aspects or other subject matter described in this document.

The above detailed description includes references to the accompanying drawings, which form a part of the detailed description. The drawings show, by way of illustration, specific embodiments in which the invention can be practiced. These embodiments are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc., are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Such instructions can be read and executed by one or more processors to enable performance of operations comprising a method, for example. The instructions are in any suitable form, such as but not limited to source code, compiled code, interpreted code, executable code, static code, dynamic code, and the like.

Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method, comprising:

depositing a first conductive layer;

depositing a dielectric layer on a surface of the first conductive layer;

forming apertures or holes in the dielectric layer using ablative optical energy;

depositing a second conductive layer on a surface of the dielectric layer opposite the first conductive layer, depositing the second conductive layer including filling at least some of the apertures or holes in the dielectric layer with conductive material; and conductively isolating a first region from a second region of the second conductive layer using ablative optical energy, including:

applying ablative optical energy to the second conductive layer;

monitoring a spectrum of an ablative plume generated by applying the ablative optical energy; and controlling the ablative optical energy in response to a characteristic of the spectrum of the ablative plume.

2. The method of claim 1, wherein at least one of the first conductive layer, the second conductive layer, or the dielectric layer are dispensed or printed in liquid or paste form.

3. The method of claim 1, comprising removing a portion of the dielectric layer to establish a specified dielectric layer profile or thickness using ablative optical energy.

4. The method of claim 1, wherein the spectrum comprises an emission spectrum; and wherein the ablative optical energy is provided using a laser.

5. The method of claim 1, wherein the first conductive layer follows a contour of a non-planar substrate.

* * * * *